(12) United States Patent
Pepperell

(10) Patent No.: US 9,065,667 B2
(45) Date of Patent: Jun. 23, 2015

(54) VIEWING DATA AS PART OF A VIDEO CONFERENCE

(75) Inventor: Andrew Pepperell, Twickenham (GB)

(73) Assignee: Codian Limited, Slough (GB)

( * ) Notice: Subject to any disclaimer, the term of this patent is extended or adjusted under 35 U.S.C. 154(b) by 1878 days.

(21) Appl. No.: 11/515,631

(22) Filed: Sep. 5, 2006

(65) Prior Publication Data

US 2008/0059581 A1    Mar. 6, 2008

(51) Int. Cl.
*H04L 12/18* (2006.01)

(52) U.S. Cl.
CPC .................................. *H04L 12/1827* (2013.01)

(58) Field of Classification Search
CPC ................................................... H04L 12/1827
USPC ................................................. 709/204, 231
See application file for complete search history.

(56) References Cited

U.S. PATENT DOCUMENTS

| | | | |
|---|---|---|---|
| 4,650,929 A | 3/1987 | Boerger et al. | |
| 4,882,747 A | 11/1989 | Williams | |
| 5,473,367 A | 12/1995 | Bales et al. | |
| 5,483,588 A | 1/1996 | Eaton et al. | |
| 5,495,522 A | 2/1996 | Allen et al. | |
| 5,600,646 A | 2/1997 | Polomski | |
| 5,640,195 A | 6/1997 | Chida | |
| 5,745,161 A * | 4/1998 | Ito | 348/14.09 |
| 5,771,273 A | 6/1998 | McAllister et al. | |
| 5,821,985 A | 10/1998 | Iizawa | |
| 5,841,763 A | 11/1998 | Leondires et al. | |
| 5,867,653 A | 2/1999 | Aras et al. | |
| 5,872,922 A | 2/1999 | Hogan et al. | |
| 5,929,898 A | 7/1999 | Tanoi | |
| 5,982,459 A | 11/1999 | Fandrianto et al. | |
| 6,025,870 A | 2/2000 | Hardy | |
| 6,128,649 A | 10/2000 | Smith et al. | |
| 6,215,515 B1 | 4/2001 | Voois et al. | |
| 6,366,771 B1 | 4/2002 | Angle et al. | |
| 6,370,113 B1 | 4/2002 | Paradiso et al. | |

(Continued)

FOREIGN PATENT DOCUMENTS

| | | |
|---|---|---|
| WO | WO-96/08911 A1 | 3/1996 |
| WO | WO-03/063484 A1 | 7/2003 |

OTHER PUBLICATIONS

Addeo, E.J. et al. (Mar. 17, 1987). "A Multi-media Multi-point Communication Services Capability for Broadband Networks," *International Switching Symposium 1987 Proceedings*, Phoenix, AZ, Mar. 15-20, 1987, 2:. C5.5.1-C5.5.6.

(Continued)

*Primary Examiner* — Harunur Rashid
(74) *Attorney, Agent, or Firm* — Lempia Summerfield Katz LLC

(57) ABSTRACT

The integration of data and video conference data allows presentations to be given more effectively and people to write down things which are hard to deliver using speech alone, for example mathematical formulae. Often when giving a presentation though it can be advantageous to be able to interact not only with a person verbally but also on a written level, for example a user may wish to draw on slides being used in a presentation to illustrate a point. At present only one user can transmit this type of data to the participants at any one time and only to participants having an H.239 compatible endpoint. The presentation invention enables multiple users to interact using written rather than spoken means without having to pass permission to transmit written data from one participant to another.

18 Claims, 5 Drawing Sheets

(56) References Cited

U.S. PATENT DOCUMENTS

| | | | |
|---|---|---|---|
| 6,445,472 | B1 | 9/2002 | Kim et al. |
| 6,496,216 | B2 | 12/2002 | Feder et al. |
| 6,574,469 | B1 | 6/2003 | Xiang et al. |
| 6,577,712 | B2 | 6/2003 | Larsson et al. |
| 6,584,076 | B1 | 6/2003 | Aravamudan et al. |
| 6,590,604 | B1 | 7/2003 | Tucker et al. |
| 6,614,465 | B2 | 9/2003 | Alexander et al. |
| 6,614,845 | B1 | 9/2003 | Azadegan |
| 6,633,324 | B2 | 10/2003 | Stephens, Jr. |
| 6,697,476 | B1 | 2/2004 | O'Malley et al. |
| 6,750,896 | B2 | 6/2004 | McClure |
| 6,757,005 | B1 | 6/2004 | Elbaz et al. |
| 6,760,749 | B1 | 7/2004 | Dunlap et al. |
| 6,771,779 | B1 | 8/2004 | Eriksson et al. |
| 6,810,035 | B1 | 10/2004 | Knuutila et al. |
| 6,989,856 | B2 | 1/2006 | Firestone et al. |
| 7,113,200 | B2 | 9/2006 | Eshkoli |
| 2002/0044201 | A1 | 4/2002 | Alexander et al. |
| 2002/0167531 | A1* | 11/2002 | Baudisch ............... 345/611 |
| 2004/0133696 | A1* | 7/2004 | Comstock et al. ........... 709/231 |
| 2004/0207724 | A1 | 10/2004 | Crouch et al. |
| 2005/0180341 | A1* | 8/2005 | Nelson et al. ............ 370/260 |
| 2005/0248652 | A1 | 11/2005 | Firestone et al. |
| 2006/0026002 | A1 | 2/2006 | Potekhin et al. |
| 2006/0077252 | A1 | 4/2006 | Bain et al. |
| 2006/0164507 | A1 | 7/2006 | Eshkoli et al. |
| 2006/0164508 | A1 | 7/2006 | Eshkoli et al. |

OTHER PUBLICATIONS

Bernard, J.D. (Jul. 14, 1999). "Streaming Services Manual: Installation and Operation," PictureTel Streaming Manual V1.0.8, 156 pages.

Boyer, D.G. et al. (Oct. 1994). "The Personal Presence System—A Wide Area Network Resource for the Real Time Composition of Multipoint Multimedia Communications," *ACM Multimedia '94 Proceedings*, San Francisco, CA, Oct. 15-20, 1994, pp. 453-460.

Compression Labs, Incorporated. (1993-1996). "Multipoint 2™: Multimedia Conference Server, Release 5.1 Administration Guide," 394 pages.

Gong, F. (1994). "Multipoint Audio and Video Control for Packet-based Multimedia Conferencing," *ACM Multimedia '94 Proceedings*, San Francisco, CA, Oct. 15-20, 1994, pp. 425-432.

Holfelder, W. (Oct. 1998). "Interactive Remote Recording and Playback of Multicast Videoconferences," *Computer Communications* 21(15):1285-1294.

Horn, D.N. et al. (Jan./Feb. 1993). "A Standards-based Multimedia Conferencing Bridge," *AT&T Technical Journal* 72(1):41-49.

International Telecommunication Union. (Feb. 1998). "H.323: Packet-based Multimedia Communications Systems," 127 pages.

International Telecommunication Union. (Nov. 2000). "H.323 Annex M.1: Tunnelling of Signalling Protocols (QSIG) in H.323," 5 pages.

International Telecommunication Union. (Jul. 2001). "H.323 Annex M3: Tunnelling of DSS1 Through H.323," 10 pages.

International Telecommunication Union. (Jul. 2001). "H.323 Annex Q: Far-end Camera Control and H.281/H.224," 9 pages.

International Telecommunication Union. (Mar. 2004). "H.320 Narrow-Band Visual Telephone Systems and Terminal Equipment," 34 pages.

International Telecommunication Union. (Sep. 2005). "H.239 Role Management and Additional Media Channels for H.3300-Series Terminals," 32 pages.

Johnson, J.T. (Aug. 1992). "Mix-and-Match Videoconferencing," *Data Communications*, pp. 73-74.

Lukacs, M.E. (Oct. 1994). "The Personal Presence System—Hardware Architecture," *ACM Multimedia '94 Proceedings*, San Francisco, CA, Oct. 15-20, 1994, pp. 69-76.

Microsoft Corporation. (Date Unknown). "NMR_901," located at <http://www.microsoft.com/windows/NetMeeting/Corp/reskit/images/NMR_901.GIF>, last visited Mar. 19, 2006, 1 page.

Microsoft Corporation. (Last updated Dec. 10, 1999). "Chapter 1: Installation Requirements and Setup," located at <http://www.microsoft.com/windows/NetMeeting/Corp/reskit/Chapter1/default.asp>, last visited Mar. 22, 2006, 8 pages.

Microsoft Corporation. (Last updated Dec. 10, 1999). "Chapter 2: Resource Kit Wizard," located at <http://www.microsoft.com/windows/NetMeeting/Corp/reskit/Chapter2/default.asp>, last visited Mar. 22, 2006, 15 pages.

Microsoft Corporation. (Last updated Dec. 10, 1999). "Chapter 4: Firewall Configuration," located at <http://www.microsoft.com/windows/NetMeeting/Corp/reskit/Chapter4/default.asp>, last visited Mar. 22, 2006, 6 pages.

Microsoft Corporation. (Last updated Dec. 10, 1999). "Chapter 7: Network Bandwidth Considerations," located at <http://www.microsoft.com/windows/NetMeeting/Corp/reskit/Chapter7/default.asp>, last visited Mar. 22, 2006, 43 pages.

Microsoft Corporation. (Last updated Dec. 10, 1999). "Chapter 8: NetMeeting Architecture," located at <http://www.microsoft.com/windows/NetMeeting/Corp/reskit/Chapter8/default.asp>, last visited Mar. 22, 2006, 4 pages.

Microsoft Corporation. (Last updated Dec. 10, 1999). "Chapter 9: Product Interoperability," located at <http://www.microsoft.com/windows/NetMeeting/Corp/reskit/Chapter9/default.asp>, last visited Mar. 22, 2006, 4 pages.

Microsoft Corporation. (Last updated Dec. 10, 1999). "Chapter 10: Understanding the T.120 Standard," located at <http://www.microsoft.com/windows/NetMeeting/Corp/reskit/Chapter10/defaultasp>, last visited Mar. 22, 2006, 9 pages.

Microsoft Corporation. (Last updated Dec. 10, 1999). "Chapter 11: Understanding the H.323 Standard," located at <http://www.microsoft.com/windows/NetMeeting/Corp/reskit/Chapter11/default.asp#mcu>, last visited Mar. 19, 2006, 11 pages.

Microsoft Corporation. (Last updated Dec. 15, 1999). "Chapter 3: Finding People," located at <http://www.microsoft.com/windows/NetMeeting/Corp/reskit/Chapter3/default.asp>, last visited Mar. 22, 2006, 7 pages.

Microsoft Corporation. (Last updated Dec. 15, 1999). "Chapter 5: NetMeeting Security," located at <http://www.microsoft.com/windows/NetMeeting/Corp/reskit/Chapter5/default.asp>, last visited Mar. 22, 2006, 13 pages.

Microsoft Corporation. (Last updated Dec. 15, 1999). "Chapter 12: Conferencing Standards," located at <http://www.microsoft.com/windows/NetMeeting/Corp/reskit/Chapter12/default.asp>, last visited Mar. 22, 2006, 4 pages.

Microsoft Corporation. (Last updated Jan. 3, 2000). "Chapter 6: Using NetMeeting on Intranet Web Pages," located at <http://www.microsoft.com/windows/NetMeeting/Corp/reskit/Chapter6/default.asp>, last visited Mar. 22, 2006, 11 pages.

Niblett, P.D. et al. (Oct. 1, 1994). "Control of Video Telephony From a Data Conferencing System," *IBM Technical Disclosure Bulletin* 37(10):327-332.

Parnes, P. et al. (Jun. 1997). "mTunnel: A Multicast Tunneling System With a User Based Quality-of-Service Model," *Interactive Distributed Multimedia Systems and Telecommunication Services*, pp. 53-62.

Rosenberg, J. et al. (Jun. 2002). "SIP: Session Initiation Protocol," located at <http://tools.ietf.org/rfc/rfc3261.txt>, last visited on Dec. 19, 2007, 236 pages.

Rosenberg, J. (Oct. 18, 2004). "A Framework for Conferencing with the Session Initiation Protocol Draft-letf-Sipping-Conferencing-Framework-03," *Internet Engineering Task Force (IETF)*, 36 pages.

Toga, J. (2000). "Introduction to H.323," PowerPoint Presentation, 10 pages.

U.S. Appl. No. 11/522,666, filed Sep. 18, 2006, by Hansen (Copy not attached.).

VCON Ltd. (2001). "VCON Conferencing Systems, MeetingPoint® Version 4.6 User's Guide," 213 pages.

Willebeek-Lemair, M.H. et al. (Oct. 1994). "On Multipoint Control Units for Videoconferencing," 19th *Conference on Local Computer Networks Proceedings*, Minneapolis, MN, Oct. 2-5, 1994, pp. 356-364.

* cited by examiner

VIEWING DATA AS PART OF A VIDEO CONFERENCE

CROSS-REFERENCE TO RELATED APPLICATIONS

Not Applicable

STATEMENT RE: FEDERALLY SPONSORED RESEARCH/DEVELOPMENT

Not Applicable

FIELD OF THE INVENTION

This invention relates to apparatus enabling participants in a video conference to interact using data such as text or pictures. The invention is applicable to use within a video conference in which, for example, a presentation or lesson is taking place.

BACKGROUND OF THE INVENTION

When using video conferencing it is useful to enable participants in the conference to transmit text or other data simultaneously with the transmission of the video (i.e. the audio and image components of the conference). This may be of use, for example, if the purpose of the conference is to give a presentation. In the case of a presentation the data could be a slide show or photographs. Alternatively, the data may be formulae in mathematical proofs or any other data which may need to be modified in real time as the conference or presentation progresses.

One method of transmitting data is to use two separate video channels connecting two endpoints either directly or indirectly through a multi conference unit (MCU). This may be achieved using the ITU-T H.239 format that was developed to enable the use of two video channels simultaneously within a single video conference.

The two video channels may be configured in order to transmit different data types. For example, a first video channel may be adapted to transmit video data which is which is advantageously displayed at a high frame rate in order that movements can be seen smoothly. In order to avoid using a large amount of network bandwidth, data sent using a high frame rate is usually sent at a low resolution. The second video channel may be adapted to transmit presentation data which, because it can be shown at a low frame rate without detracting from the appearance of the data, can be displayed at a high resolution so that all the detail of the presentation data can readily be seen.

Video data is defined for the purposes of this description as data having an audio component, such as the voice of a person, and an image component such as the view of the person. Presentation data is defined for the purposes of this description as being data which is preferably displayed using a low frame rate but high resolution. It may be, for example, text, one or more PowerPoint slides or pages from a pdf file.

FIG. 1 illustrates a prior art configuration of a video conference that is being transmitted using H.239. It can be seen that the video conference is taking place between two endpoints 10, 12 that are H.239 enabled i.e. are able to display data transmitted using H.239 and transmit data using H.239.

Each of the H.239 enabled endpoints 10, 12 has two channels 14, 16 along which data is transmitted to an MCU 18. The two channels may both transmit video data or presentation data. Alternatively, one channel may transmit video data and the other presentation data. The MCU 18 will process the data as required and transmit the processed data to the relevant endpoint 10, 12. Data may also be transmitted directly between the two H.239 enabled endpoints.

The user may view the data either on separate screens; one for presentation data and one for the video data, or, alternatively, the user may view the data as a composite image on a single screen of an H.239 enabled endpoint. H.239 can therefore be used in a video conference to enable data received from two inputs such as a presentation input for presentation data and a video input to be output onto one screen at the endpoint.

In a conventional H.239 conference a token is created which is passed between conference participants. Only the participant in the conference holding the token can transmit presentation data to all the other participants. This means that there is no way for the conference participants to interact directly with any presentation data displayed unless they are holding the token. This restricts the interaction of the participants.

BRIEF SUMMARY

In accordance with a first aspect of the present invention there is provided a Multi-Conference Unit (MCU) for use in transmitting a video conference to endpoints connected to the video conference, the MCU comprising a video input for receiving a video data stream including video data, a presentation input for receiving a presentation data stream including presentation data, processing means adapted to combine the data in the video and presentation data streams to produce a combined data stream and an output adapted to transmit the combined data stream from the MCU to an endpoint connected to the video conference.

The endpoint receiving the combined data stream may include two display devices, the first device displaying the video data and the second device displaying the presentation data. Alternatively, the endpoint receiving the combined data stream includes one display device, wherein the presentation data and video data is displayed upon the same display device.

The MCU may further include a second presentation input for receiving a presentation data stream including mark-up data from an endpoint remote from that transmitting the presentation data stream received by the first presentation input, the MCU also comprising a second processing means adapted to combine the presentation data received from the first endpoint and the second endpoint.

Presentation data in the presentation data stream may be received by the MCU in an H.239 format. Alternatively, the presentation data in the presentation data stream may be received by the MCU in a VNC format.

The combined data stream may be transmitted in a format selected from a group including H.323, H.320 and SIP.

In accordance with a second aspect of the present invention there is provided a method for integrating data from two data channels during a video conference, the method comprising the steps of receiving a video data stream from a video input the video data stream including video data, receiving a presentation data stream from a presentation input the presentation data stream including presentation data, combining the data in the video and presentation data streams to produce a combined data stream and transmitting the combined data stream to an endpoint connected to the video conference.

The step of transcoding the presentation data stream from a first format into a second format may take place prior to combining the video and presentation data streams.

The combined data stream may be transmitted in one of the group of formats comprising H.323, H.320 and SIP.

In accordance with a third aspect of the present invention there is provided a non-transitory computer readable storage medium encoded with instructions that are executable on an MCU to cause the MCU to combine a video data stream and a presentation data stream to produce a combined data stream and transmit the combined data stream to an endpoint connected to the video conference wherein the video data stream includes video data and the presentation data stream includes presentation data.

In accordance with a fourth aspect of the present invention there is provided a multi-conference unit (MCU) for use in transmitting a video conference to endpoints connected to the video conference, the MCU comprising an input adapted to receive a presentation data stream using a first protocol from an endpoint, the presentation data stream including presentation data and being in a first format, encoding means adapted to convert the presentation data from a first format to a second format, processing means adapted to encapsulate the presentation data using a transmission protocol and an output adapted to transmit the converted presentation data using the transmission protocol from the MCU to an endpoint connected to the video conference.

The presentation data stream may be received from a VNC server. Additionally, the presentation data in the converted data stream may comprise a series of JPEG images. The transmission protocol may be H.239.

The MCU may further include a second input adapted to receive a video data stream and a second output adapted to transmit a video data stream.

The outputs may transmit the converted presentation data stream and video data stream to an endpoint including two display devices, the first display device displaying the presentation data in the converted data stream and the second display device displaying the video data in the video data stream.

The MCU preferably, further comprises a second input for receiving a presentation data stream including mark-up data from a second endpoint and a second processing means adapted to combine the presentation data received from the first endpoint and the second endpoint.

In accordance with a fifth aspect of the present invention there is provided a method for processing presentation data during a video conference the method comprising the steps of receiving a presentation data stream from a first endpoint, the presentation data stream including presentation data and being in a first format, converting the presentation data from the first format to a second format, encoding means adapted to encapsulate the presentation data using a transmission protocol and transmitting the converted presentation data using the transmission protocol from the MCU to an endpoint connected to the video conference.

A second data stream including mark-up data may also be received from a second endpoint and the MCU may combine the presentation data received from the first endpoint and the second endpoint.

The presentation data in the converted data stream may comprise a series of JPEG images.

In accordance with a sixth aspect of the present invention there is provided a non-transitory computer readable storage medium encoded with instructions that are executable on an MCU and adapted to cause an MCU to, on receipt of a presentation data stream in a first format, the presentation data stream including presentation data, convert the presentation data from the first format to a second format and encapsulate the presentation data using a transmission protocol and transmit a converted data stream comprising presentation data in the second format from the MCU to an endpoint connected to the video conference using the transmission protocol.

In accordance with a seventh aspect of the present invention there is provided a personal computer adapted to participate in a video conference comprising a first input adapted to receive video data, a presentation input adapted to receive presentation data, processing means adapted to detect mark-up data entered by a user and an output adapted to transmit the mark-up data to a multi conference unit.

BRIEF DESCRIPTION OF THE DRAWINGS

Embodiments of the invention will now be described by way of example and with reference to the following drawings in which.

DETAILED DESCRIPTION

For the purposes of the present description a video data stream is defined as a data stream which includes video data which is advantageously displayed at a high frame rate in order that movements can be seen smoothly. A presentation data stream is defined as a data stream which includes presentation data, such as a slide show.

Furthermore, for the purposes of the present description a combined data stream is defined as a data stream which incorporates data which has been produced from the merging of data received from two or more separate endpoints. The data to be merged may include mark-up which is defined, for the purpose of this description, as an input made by a user with reference to presentation data displayed to the user at an endpoint. The mark-up may, for example, be text typed onto a computer or hand-written marks made on a touch sensitive screen.

A converted data stream is defined as a data stream which has been converted from one data format to a second data format by the MCU before it is transmitted to an endpoint. An example of a data format is JPEG which is used for some presentation data. Formatted data is transmitted to an endpoint using a transmission protocol, such as SIP, H.323 or H.239.

Figure 1:
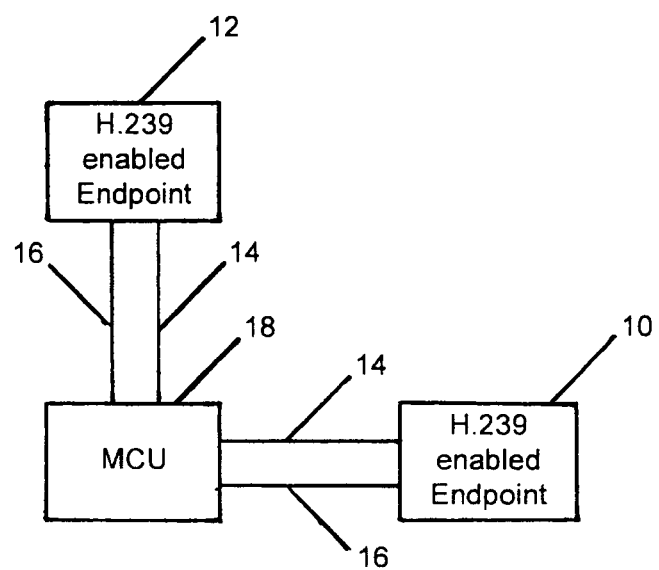
FIG. 1 illustrates a prior art network in which two H.239 enabled endpoints are connected to a video conference.
Figure 2:
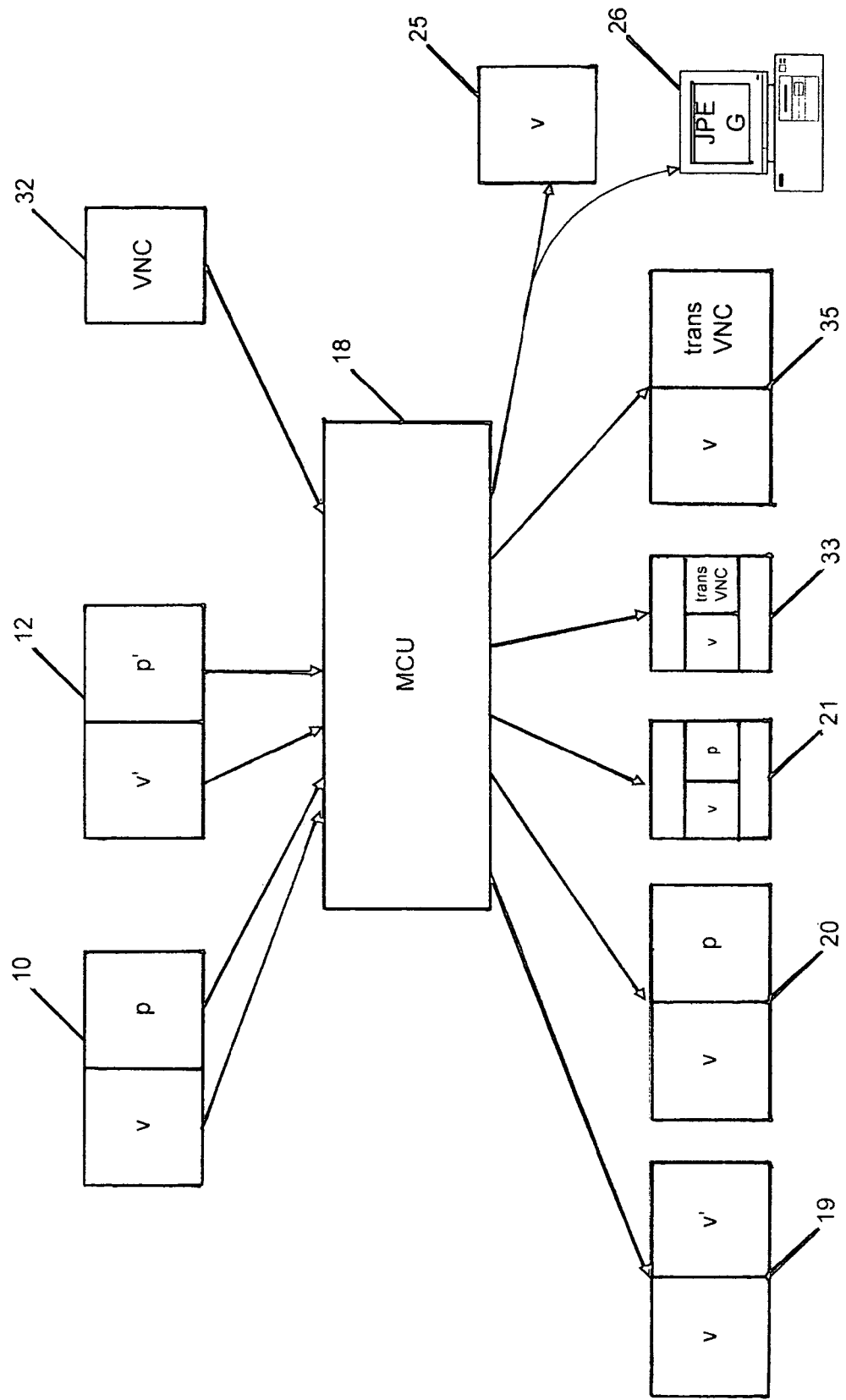
FIG. 2 illustrates inputs and outputs with which the present invention may be implemented.
Figure 3:
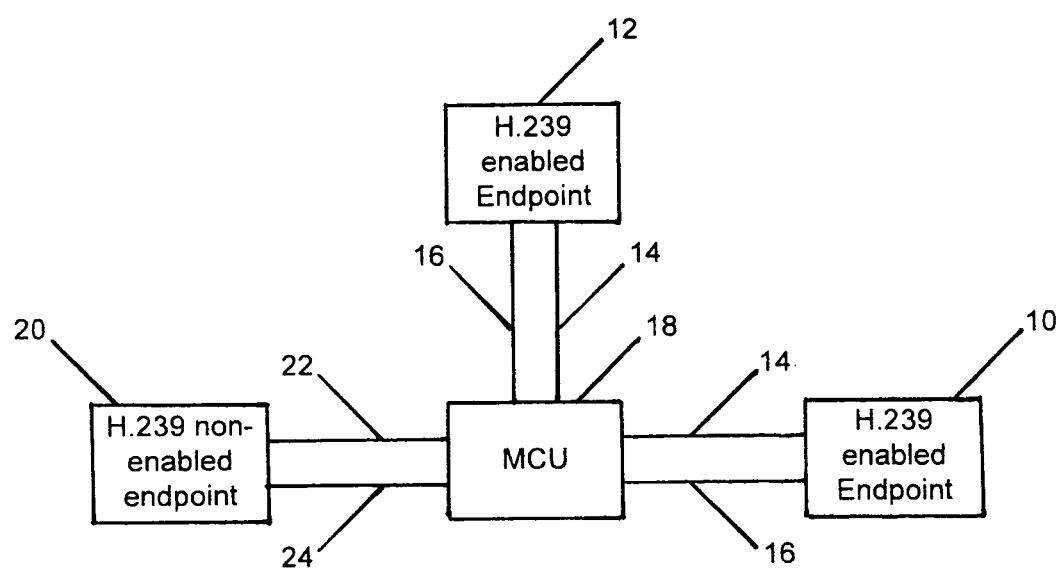
FIG. 3 illustrates an embodiment of the present invention in which two H.239 enabled endpoints and a non-H.239 enabled endpoint are connected to a video conference.

Transmitting Data Received from Two Video Channels to a Conventional Video Endpoint FIGS. 2 and 3 illustrate a video conference in which one embodiment of the present invention may be implemented. Multiple endpoints 10, 12, 19, 20 and 21 are connected to an MCU 18. Endpoints 10 and 12 are H.239 enabled endpoints that may transmit data to other endpoints in the video conference using two channels 14, 16. Endpoints 10 and 12 may comprise two screens, as illustrated in FIG. 2, where one screen is used to display video data (v) and the other screen displays presentation data (p) or, alternatively, the endpoints may have one display screen displaying both video and presentation data.

At least one endpoint 19, 20 or 21 participating in the video conference is not able to process video and presentation data for the same video conference that is received simultaneously from two video channels. The endpoint 19, 20 or 21 may be, for example, an H.323 endpoint, an H.320 endpoint, a SIP endpoint or any other endpoint that is suitable for participating in video conferences.

The endpoint may have two display devices each of which may display a different output, as illustrated by endpoints 19 and 20 in FIG. 2. In this instance endpoint 19 displays video data received from endpoints 10 and 12, endpoint 20 displays the video and presentation data received from endpoint 10. The endpoint may, on the other hand, only have one display device which displays both the presentation data and video data produced by the MCU as shown in the illustration of endpoint 21 in FIG. 2.

The endpoints are connected to a multi conference unit (MCU) 18 that receives, processes and transmit data received from any endpoint participating in a video conference. By transcoding, the endpoint is able to produce the detailed functionality described below.

Returning to FIG. 3, the users at the endpoints 10, 12, 20 connect to a video conference using any suitable means. For example, the user may dial into the MCU 18 and connect directly to a video conference. Dialing a number specifically assigned to the conference allows the user to connect to a specific video conference. Alternatively the user may connect to the MCU and then select the desired conference from a list displayed at their endpoint as described in U.S. patent application Ser. No. 10/962,912.

The MCU 18 determines the type of endpoint and its capabilities, for example, whether it can process two video channels simultaneously transmitted to it within a single video conference. Therefore, in the present example, the MCU 18 determines when the endpoints 10, 12 connect to it and that both endpoints 10 and 12 are able to transmit, receive and display data transmitted through two data channels. The MCU 18 also determines that endpoint 20 is not able to transmit, receive and display data transmitted through two data channels.

Once connected to a conference the user becomes a conference participant and is able to view data being transmitted by the other participant's endpoints 10, 12, 20 on the screen of their endpoint 10, 12, 20. In the network of the present example H.239 enabled endpoint is the endpoint transmitting data to the MCU 18 through two video channels, for example it is transmitting video data through channel 14 and presentation data, such as power point presentation data, through channel 16. The H.239 enabled endpoint 12 is only transmitting video data to the MCU 18 and the non-H.239 enabled endpoint 20 is transmitting video data to the MCU 18 using channel 22.

The MCU 18 on receiving all the data transmitted by the endpoints 10, 12, 20 processes the data to combine all the video data received from the endpoints 10, 12, 20. The MCU 18 has determined that H.239 enabled endpoint 21 can receive the data from the video conference using two channels. Therefore, the MCU transmits the combined video data to endpoint 12 through channel 14 and transmits the presentation data received from endpoint 10 to endpoint 12 using a separate channel 16.

The MCU 18 has also determined that endpoint 20 cannot receive data transmitted through two data channels. Therefore, the MCU 18 decodes the data transmitted from all the endpoints and, in addition to combining the video data received from all the endpoints the MCU also combines the presentation data. The data is combined in such a way that the combined portions of data are displayed on different sections of the endpoint 20's display. If desired the user may select to replace the image of a user at one of the endpoints with the image of the presentation data.

The MCU 18 then transcodes the combined data into a format which can be readily viewed at endpoint 20. The data is then transmitted to the endpoint 20 through data channel 24 using any suitable protocol such as H.323, H.320 or SIP. The protocol may be selected according to the type of endpoint that MCU 18 determined that it is transmitting data to.

Transmitting Data Received from Two Video Channels to a Personal Computer

Figure 4:
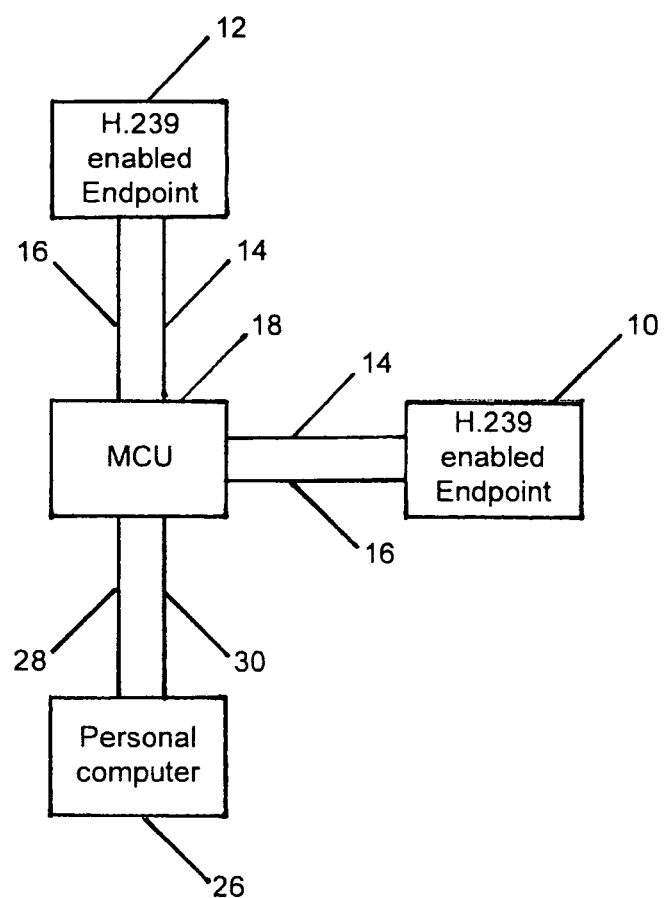
FIG. 4 illustrates an embodiment of the present invention in which two H.239 capable endpoints and a personal computer are connected to a video conference.

FIG. 4 illustrates a video conference in which a second embodiment of the present invention may be implemented. Multiple endpoints 10, 12, 26 are connected to an MCU 18. Endpoints 10 and 12 are H.239 enabled endpoints that may transmit data to other endpoints in the video conference using two channels 14, 16. At least one endpoint 26 participating in the video conference is a personal computer.

The personal computer is provided with at least one video endpoint application that enables the computer to process data that the personal computer 26 receives from the MCU 18. The application may, for example, be a Java Applet or any other suitable application.

The video endpoint application may be present on the personal computer 26 before the MCU 18 contacts it. Alternatively, a user may manually download the video endpoint application to the computer, for example, from a website. Optionally, the MCU 18 may be provided with means for detecting the presence of the video endpoint application on the personal computer 26, and causing the application to be updated or installed as required. The final option is described in the co-pending US Application entitled "Method for Adapting a Device to Participate in Video Conference Calls" the disclosure of which is herein incorporated by reference.

When the personal computer 26 connects to the MCU in order to connect to a video conference or to indicate availability for participation in video conferences the MCU determines the video endpoint applications present on the personal computer 26. This may be done by transmitting a request message requesting details of video endpoint applications on the personal computer to the personal computer 26. Alternatively, details of any changes to any video endpoint applications that have occurred since the personal computer last connected to an MCU 18. As discussed above, the MCU 18 may, if required, cause one or more video endpoint applications to be installed on the personal computer 26.

After the MCU 18 has determined whether a video endpoint application is present on the personal computer 26 it may then select a suitable codec for converting the data format into a data format that the personal computer 26 can process. It is preferable that the combined video data is sent using a separate channel, 28, to the channel used to send presentation data, in this instance channel 30.

If, for example, the personal computer has a Java applet viewer which is able to decode and process JPEG images then the MCU 18 may convert presentation data received from H.239 enabled endpoint 10 from the format to a series of JPEG images. The JPEG images are then transmitted to the personal computer 26 which processes the JPEGs using the Java applet and displays the JPEGs at the endpoint.

This invention is not limited to the MCU producing 'JPEG' images typically encoded according to the ISO/IEC IS 10918-1 or ITU-T Recommendation T.81 standard. Rather, for the purposes of this specification, the term JPEG may be taken to include, in addition to JPEG images, JPEG-like images or any other suitable compressed or uncompressed data format which may be processed by an applet and displayed by the personal computer 26. Similarly, the video endpoint application is not limited to a Java applet but may be any suitable application that when executed by the personal computer 26 enables the personal endpoint to display images received from an MCU 18.

The video data that has been combined into composite video data may be converted into a suitable format separately to the presentation data. For example, if a separate video endpoint application, for example a streaming application such as Quicktime is running to process the video data received by the personal computer 26. The personal computer 26 may have the video endpoint applications for displaying the presentation data and video data set up so that the presentation and video data are both displayed on the same display of the personal computer 26.

If desired, the video and presentation data may be transmitted to two separate display devices as illustrated in FIG. 2 where the video output is transmitted to video endpoint 25 and the presentation data is transmitted from display on personal computer 26. The video and presentation data may also be transmitted to two separate personal computers associated with each other such that the video data is shown to the user on one display and the presentation data is shown to the user on the other display.

Alternatively, the video and presentation data may be combined and transmitted to the personal computer using a single channel. In this case a single video endpoint application at the personal computer may decode and process the data received by the personal computer from the MCU.

Transmitting Presentation Data from a Personal Computer Connected to a Video Conference.

As discussed previously the conventional H.239 protocol only allows transmission of presentation data from one presentation data source. In the present invention the use of a video endpoint application at the personal computer may be used to allow any participant in a video conference to alter the appearance of the presentation data.

When a user using a personal computer 26 annotates the presentation data, for example by scribbling notes on the presentation data or typing or drawing on the screen of their endpoint (preferably a user is allowed to draw on the screen using a mouse or any other suitable method), this is registered by a video endpoint application on their endpoint. The user annotations are preferably made on the presentation data image such as the slides or text.

The personal computer encodes the annotations the user has entered into the personal computer and transmits the presentation data to the MCU. The presentation data received by the MCU from the personal computer is combined with presentation data received from the H.239 enabled endpoint. In this way the presentation data transmitted to endpoints connected to the conference is made up of presentation data from two or more endpoints. If more than one personal computer is connected to the video conference then presentation data may be received by the MCU from one or more of the personal computers connected to the video conference.

The personal computers may be considered as having a bidirectional virtual data connection with the MCU. This is because the personal computers are able to transmit presentation information to the MCU rather than just receiving presentation information from the MCU.

Figure 5:
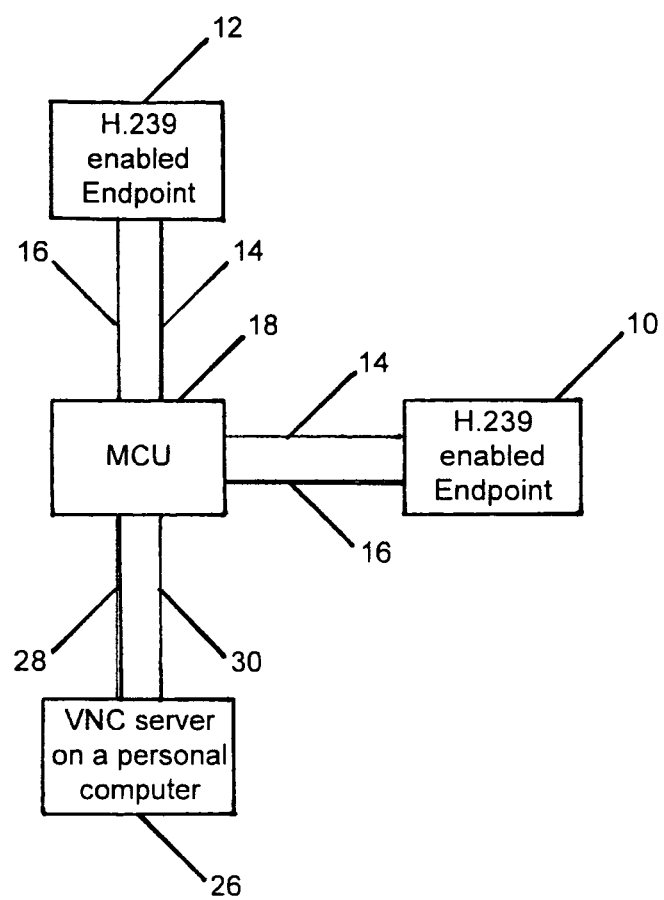
FIG. 5 illustrates an embodiment of the present invention in which a personal computer is connected to an MCU using a VNC server.

Alternatively, the presentation data may originate from a virtual network computer (VNC) server 32 as shown in FIGS. 2 and 5. The VNC server 32 creates a low bandwidth stream of the display of a PC desktop, and therefore can be used to transmit presentation data using a VNC format to the MCU through a VNC connection 34. By using the VNC format to transmit the presentation data, the frame rate for the data is maintained without losing any data resolution.

The MCU may then transcode the data from the VNC format to the format in which the data will be transmitted to other endpoints in the video conference. As discussed above with reference to H.239 non-enabled endpoints the data transmitted by the MCU 18 may be displayed on a single display device 33, as shown in FIG. 2. Alternatively, the endpoint 35 may have two display devices, one for displaying video data transmitted by the MCU 18 and the other for displaying presentation data transmitted by the MCU 18.

If other endpoints are also transmitting presentation data to the MCU then the transcoded data that has been received from the VNC is combined with the presentation data received from the other endpoints and then transmitted by the MCU.

What is claimed is:

1. A video conference system, comprising:
  a Multi-Conference Unit (MCU) to communicatively couple plural endpoints in a video conference, the MCU including,
  a video input that receives plural video data streams including video data from the plural endpoints,
  a first presentation input that receives a first presentation data stream including presentation data from a first endpoint,
  a second presentation input that receives a second presentation data stream including mark-up data from a second endpoint, wherein the mark-up data is an input made by a user with reference to the first presentation data,
  a processor that combines the data in the plural video data streams, the presentation data stream, and the mark-up data to produce a combined data stream, and
  an output that transmits the combined data stream from the MCU to at least one of the plural endpoints connected to the video conference,
  wherein the at least one of the plural endpoints receiving the combined data stream includes two display devices, and a first device of the two display devices displays the video data from the combined data stream and a second device of the two display devices displays the presentation data from the combined data stream.

2. The video conference system as claimed in claim 1, wherein the presentation data is received by the MCU in an H.239 format.

3. The video conference system as claimed in claim 1, wherein the presentation data in the presentation data stream is received by the MCU in a VNC format.

4. The video conference system as claimed in claim 1, wherein the combined data stream is transmitted in a format selected from a group including H.323, H.320 and SIP.

5. A video conference system, comprising:
  a Multi-Conference Unit (MCU) to communicatively couple plural endpoints in a video conference, the MCU including,
  a video input that receives plural video data streams including video data from the plural endpoints,
  a first presentation input that receives a first presentation data stream including presentation data from a first endpoint,
  a second presentation input that receives a second presentation data stream including mark-up data from a second endpoint, wherein the mark-up data is an input made by a user with reference to the first presentation data, a processor that combines the data in the plural video data streams, the presentation data stream, and the mark-up data to produce a combined data stream, and an output that transmits the combined data stream from the MCU to at least one of the plural endpoints connected to the video conference, wherein the at least one of the plural endpoints receiving the combined data stream includes one display device, and the presentation data and video data from the combined data stream are displayed upon the one display device.

6. A method for integrating data during a video conference including a plurality of endpoints, comprising:

receiving, at a Multi-Conference Unit (MCU), a video data stream from a video input, the video data stream including video data from a first endpoint;

receiving, at the MCU, a presentation data stream from a presentation input, the presentation data stream including presentation data from the first endpoint;

receiving, at the MCU, a second presentation data stream including mark-up data from a second endpoint, wherein the mark-up data is an input made by a user with reference to the presentation data;

combining, at the MCU, the data in the video data stream, the first presentation data stream and the mark-up data to produce a combined data stream; and transmitting, from the MCU, the combined data stream to at least one of the plurality of endpoints connected to the video conference, wherein the at least one of the plurality of endpoints receiving the combined data stream includes at least one display device, and the presentation data and video data from the combined data stream are displayed upon the at least one display device.

7. The method as claimed in claim 6, further comprising: transcoding the presentation data stream from a first format into a second format prior to the combining.

8. The method as claimed in claim 6, further comprising: transmitting the combined data stream in one of the group of formats comprising H.323, H.320 and SIP.

9. A non-transitory computer-readable storage medium, including computer program instructions accessed and executed by a multi-conference unit (MCU) to implement a method of processing presentation data, the method comprising:

receiving, at the MCU, a video data stream from a video input, the video data stream including video data from a first endpoint;

receiving, at the MCU, a presentation data stream from a presentation input, the presentation data stream including presentation data from the first endpoint;

receiving, at the MCU, a second presentation data stream including mark-up data from a second endpoint, wherein the mark-up data is an input made by a user with reference to the presentation data;

combining, at the MCU, the data in the video data stream, the first presentation data stream and the mark-up data to produce a combined data stream; and transmitting, from the MCU, the combined data stream to at least one of the plurality of endpoints connected to the video conference, wherein the at least one of the plurality of endpoints receiving the combined data stream includes at least one display device, and the presentation data and video data from the combined data stream are displayed upon the at least one display device.

10. A multi-conference unit (MCU) for use in transmitting a video conference to a plurality of endpoints connected to the video conference, the MCU comprising:

a first input that receives a presentation data stream at the MCU using a first protocol from a first endpoint, the presentation data stream including presentation data and being in a first format;

a second input for receiving a presentation data stream including mark-up data from a second endpoint, wherein the mark-up data is an input made by a user with reference to the presentation data;

encoding means for converting the presentation data from a first format at the MCU to a second format at the MCU;

processing means for encapsulating the presentation data at the MCU using a transmission protocol, and for combining the presentation data received from the first endpoint and the mark-up data received from the second endpoint; and an output that transmits the converted, encapsulated, and combined presentation data using the transmission protocol from the MCU to a second endpoint connected to the video conference, wherein the second endpoint receiving the combined presentation data includes at least one display device, and the presentation data and the mark-up data from the combined presentation data are displayed upon the at least one display device.

11. The MCU as claimed in claim 10, wherein the presentation data stream is received from a VNC server.

12. The MCU as claimed in claim 10, wherein the presentation data in the converted presentation data comprises a series of JPEG images.

13. The MCU as claimed in claim 10, wherein the transmission protocol is H.239.

14. The MCU as claimed in claim 10, wherein the MCU further includes a second input that receives a video data stream and a second output that transmits a video data stream.

15. The MCU as claimed in claim 14, wherein the output transmits the presentation data stream and video data stream to an endpoint including two display devices, the first display device displaying the presentation data in the converted data stream and the second display device displaying the video data in the video data stream.

16. A method for processing presentation data during a video conference, comprising:

receiving, at a Multi-Conference Unit (MCU), a presentation data stream from a first endpoint, the presentation data stream including presentation data and being in a first format;

receiving, at the MCU, a second data stream including mark-up data from a second endpoint;

combining the presentation data received from the first endpoint and the mark-up data received from the second endpoint to create combined presentation data;

converting, at the MCU, the combined presentation data from the first format to a second format;

encapsulating, at the MCU, the combined presentation data using a transmission protocol; and transmitting the converted, encapsulated, and combined presentation data using the transmission protocol from the MCU to at least one of a plural endpoints connected to the video conference, wherein the at least one of the plural endpoints receiving the combined presentation data includes at least one display device, and the presentation data and video data from the combined presentation data are displayed upon the at least one display device.

17. The method for processing presentation data as claimed in claim 16, wherein the presentation data in the converted data stream comprises a series of JPEG images.

18. A non-transitory computer-readable storage medium, including computer program instructions accessed and executed by a multi-point conference unit (MCU) to implement a method of processing presentation data, the method comprising:

receiving, at a Multi-Conference Unit (MCU), a presentation data stream from a first endpoint, the presentation data stream including presentation data and being in a first format;

receiving, at the MCU, a second data stream including mark-up data from a second endpoint;

combining the presentation data received from the first endpoint and the mark-up data received from the second endpoint to create combined presentation data;

converting, at the MCU, the combined presentation data from the first format to a second format;

encapsulating, at the MCU, the combined presentation data using a transmission protocol; and transmitting the converted, encapsulated, and combined presentation data using the transmission protocol from the MCU to at least one of plural endpoints connected to the video conference, wherein the at least one of the plural endpoints receiving the combined presentation data includes at least one display device, and the presentation data and mark-up data from the combined presentation data are displayed upon the at least one display device.

\* \* \* \* \*